US006973953B2

(12) United States Patent
Winner

(10) Patent No.: US 6,973,953 B2
(45) Date of Patent: Dec. 13, 2005

(54) SCREEN DOOR

(76) Inventor: Kurt Winner, 251 Poipu Dr., Honolulu, HI (US) 86825

( * ) Notice: Subject to any disclaimer, the term of this patent is extended or adjusted under 35 U.S.C. 154(b) by 0 days.

(21) Appl. No.: 10/637,355

(22) Filed: Aug. 7, 2003

(65) Prior Publication Data

US 2005/0028949 A1    Feb. 10, 2005

(51) Int. Cl.[7] .............................................. A47G 5/00
(52) U.S. Cl. ..................................... 160/381; 403/403
(58) Field of Search ............................... 160/371, 381; 16/105, 32, 33; 403/403, 401, 402, 298, 295

(56) References Cited

U.S. PATENT DOCUMENTS

| | | | | |
|---|---|---|---|---|
| 2,989,788 | A | * | 6/1961 | Kessler ...................... 403/295 |
| 3,269,455 | A | * | 8/1966 | Gillotti ...................... 160/369 |
| 3,613,279 | A | * | 10/1971 | Belfor ......................... 40/782 |
| 3,729,868 | A | * | 5/1973 | Burum ........................ 49/420 |
| 4,102,009 | A | * | 7/1978 | Kelly .......................... 16/100 |
| 4,195,681 | A | * | 4/1980 | Douglas et al. .............. 160/371 |
| 4,831,804 | A | * | 5/1989 | Sayer ......................... 52/475.1 |
| 5,154,531 | A | * | 10/1992 | Peterson ..................... 403/205 |

\* cited by examiner

*Primary Examiner*—Blair M. Johnson
(74) *Attorney, Agent, or Firm*—Ostrolenk, Faber, Gerb & Soffen, LLP

(57) ABSTRACT

A door having four lineal door frame components, each of the lineal components having a cross-section defining an interior space extending in a longitudinal direction of the linear components. Four symmetric, L-shaped members are provided that each have a corner portion and two posts that extend from the corner portion at a right angle to one another. The posts each have a length and a plurality of fins extending therefrom along at least portions of the length. A metal reinforcement member is arranged in the hollow portion of the lineal components so as to extend substantially along the entire length of the lineal components and leave an empty portion of the hollow section at each end of the lineal components, which empty portions have a length equal to at least the length of the posts of the L-shaped body. The posts of the L-shaped members are mounted in the free hollow portions of the lineal components so that at least some of the fins engage an interior surface of the lineal components.

20 Claims, 4 Drawing Sheets

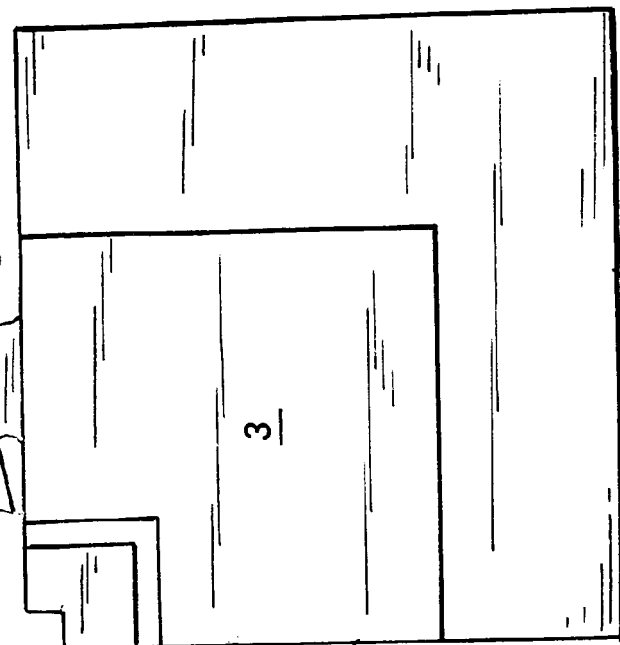
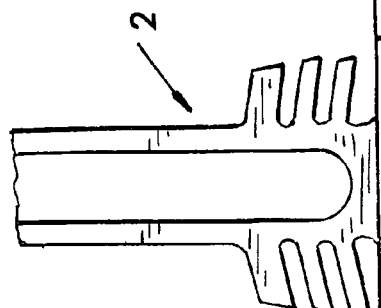
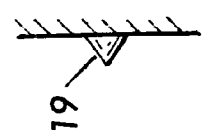
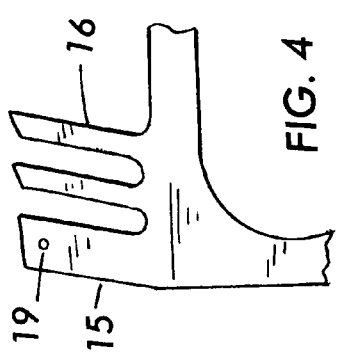
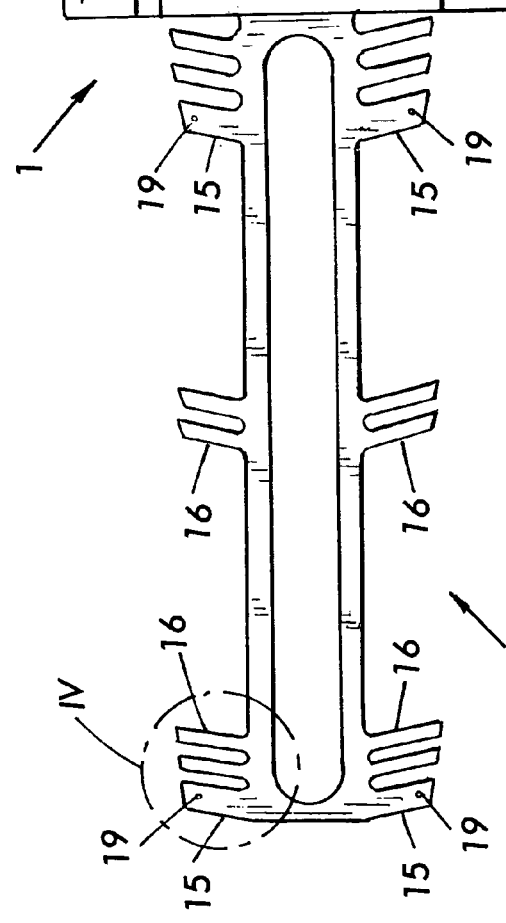

SCREEN DOOR

BACKGROUND OF THE INVENTION

The present invention relates to patio or storm doors, and in particular to rolling screen doors. More specifically the invention relates to a corrosion free, high quality screen door that can be compactly shipped anywhere and site assembled with a minimum of tools.

Rolling screen doors are most commonly made from aluminum extrusions that are assembled at the factory using zinc die cast corner brackets and steel screws. This combination of zinc contacting aluminum and steel in the presence of water, particularly salt water, produces electricity which results in electrolysis and the rapid destruction of the metals involved.

Most rolling screen doors are factory assembled in standard or custom-made sizes. If the screen door does not fit a door opening properly it must be remanufactured in the proper size at the factory.

Furthermore, screen doors are generally inexpensively manufactured from materials that corrode easily, function poorly and require frequent service.

There is a need for a superior maintenance free screen door that is made of corrosion resistant materials that operate smoothly and consistently in a wet environment, and which can be site assembled and cut to the exact dimensions required at the installation site using a minimum of assembly tools.

SUMMARY OF THE INVENTION

Accordingly, it is an object of the present invention to provide a high-quality, corrosion resistant door, and in particular a rolling screen door.

It is another object of the invention to provide a compact door kit that can be easily shipped and assembled on site.

Pursuant to these objects, and others which will become apparent hereafter, one aspect of the present invention resides in a door having four lineal door frame components, each of the lineal components having a cross-section defining an interior space extending in a longitudinal direction of the linear components. Four symmetric L-shaped corner members are provided that each have a corner portion and two posts that extend from the corner portion at a right angle to one another. The posts each have a length and a plurality of fins extending therefrom along at least portions of the length. A metal reinforcement member is arranged in the hollow portion of the lineal components so as to extend substantially along the entire length of the lineal components and leave an empty portion of the hollow section at each end of the lineal components, which empty portions have a length equal to at least the length of the posts of the L-shaped member. The posts of the L-shaped members are mounted in the free hollow portions of the lineal components so that at least some of the fins engage an interior surface of the lineal components. The door components are made of extruded plastic so that any metal contact within the door is eliminated as is the possibility of electrolytic corrosion. The symmetric injection molded corner brackets are non-handed and fit into straight 90° cutoff extrusions so that no miter cuts are necessary to assemble the door. Furthermore, the bottom two corner brackets of the door contain plastic adjustable rollers. The fit and alignment of the corner brackets within the extrusion is guaranteed by a unique self-aligning system in both planes thereby compensating for the varying internal dimensions of the plastic extrusions in an equal and accurate manner.

The corner members extend deeply into the linear frame components to provide a stable connection of the two frame components connected by the corner member. Elastic extrusions made from PVC, commonly used in window and door framing, are somewhat flexible and require an internal metal reinforcement in order to obtain beam stiffness. The rigid support at the corner provided by the corner member extends for some distance from the end of the corner. Bending stresses due to door operation "racking" of the door frame are greatest at the corners of the frame. A large, rigid, deeply inserted and tight fitting corner member as in the present invention provides exceptional resistance to this racking.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described therein.

BRIEF DESCRIPTION OF THE DRAWINGS

FIG. 3 is a partial view of the corner bracket;

FIG. 4 is an enlarged view of a section IV in FIG. 3;

FIG. 5 is an enlarged side view of a gauge point;

DETAILED DESCRIPTION OF PREFERRED EMBODIMENTS

Figure 1:
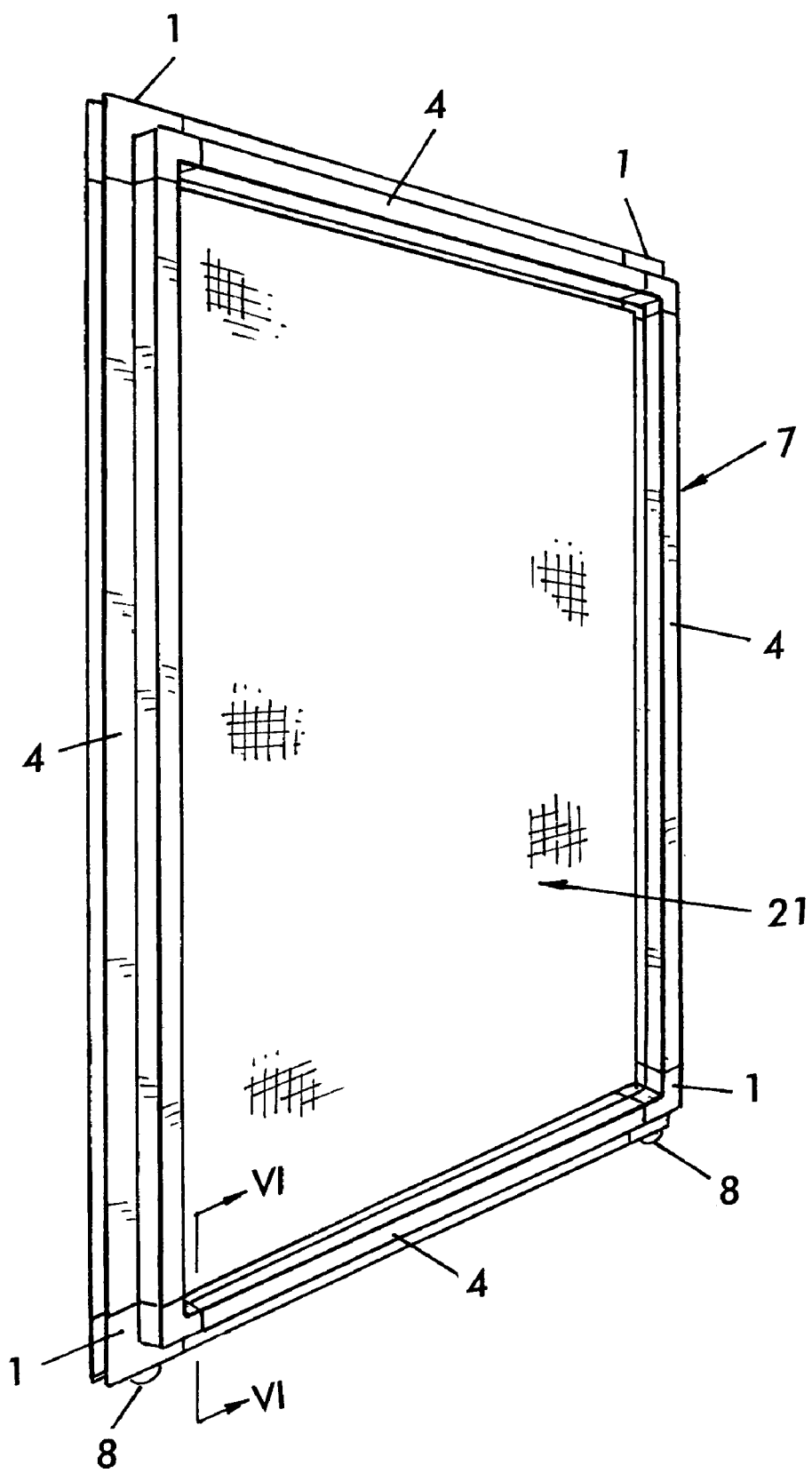
FIG. 1 is a perspective view of the assembled screen door pursuant to the present invention.

FIG. 1 shows an assembled screen door pursuant to the present invention. The screen door has a door frame 7 made up of lineal frame components 4 connected together by four corner brackets 1. The entire door frame 7 is made of extruded or injection molded plastic. A screen 21 is mounted at its outer periphery to the frame 7 by being held in a groove 22 of the frame 7 by beading, as is conventional in the art.

Figure 2:
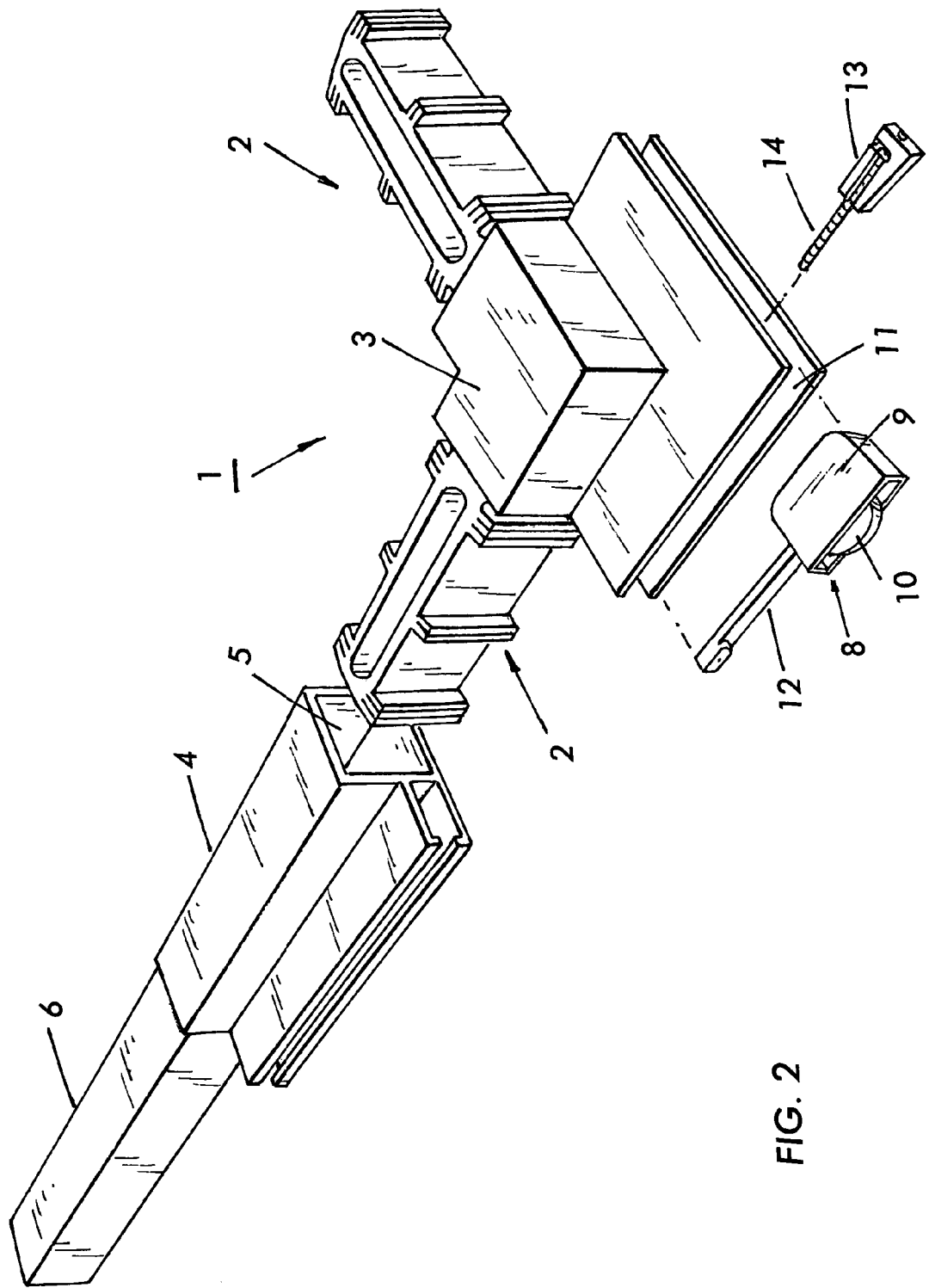
FIG. 2 is an exploded view of the screen door corner bracket.

FIG. 2 is an exploded view of a corner of the screen door shown in FIG. 1. As can be seen here, the corner bracket 1 is generally L-shaped and has two finned square posts 2 at 90° to each other and connected to an integral exposed corner 3 that conforms to the exact outside dimensions of the extruded plastic door lineal frame component 4. By inserting each of the corner bracket finned posts 2 into a hollow portion 5 of the extruded plastic door frame component 4, a tight fitting, perfectly aligned corner is obtained. Prior to insertion of the corner bracket 1 into the frame component 4, a metal reinforcement 6 is inserted into the hollow portion 5 of the extruded plastic door frame component 4 for the full unoccupied length of the component 4. The complete door frame 7 has four frame components 4 with reinforcements 6, thereby providing the rigidity necessary to support the somewhat flexible plastic door frame 7, resulting in a rigid screen door structure. The frame components 4 are held together by four of the corner brackets 1. The corner brackets 1 are reinforced by containing glass fiber or another filler material.

A roller assembly 8 is provided at each of the corner brackets 1 at the bottom of the frame 7. Each of the roller assemblies 8 includes an outer housing 9 and a wheel 10 that are injection-molded components. The wheel 10 has a stainless steel axle which snaps into the housing 9 to form an assembly. The corner bracket 1 has a recess 11 molded into the perimeter of the corner bracket, which recess corresponds to a recess in the frame components 4. The roller assembly 8 is sized to fit loosely into the recess 11 so that the recess restricts movement of the roller assembly 8 to a single plane. The roller assembly 8 is mounted to the corner bracket 1 by a flexible lever arm 12 so that the roller assembly is adjustable (see FIG. 7). The lever arm 12 is, for example, attached to the corner bracket 1 by a screw, rivet or snap-in connection. The roller assembly can thus be adjusted vertically by a wedge-shaped jack-block 13. The jack-block 13 is slideably driven between the roller assembly and the base of the recess by a stainless steel screw 14 rotatably mounted within the jack-block and engagable with a screw hole in the corner bracket 1.

Figure 7:
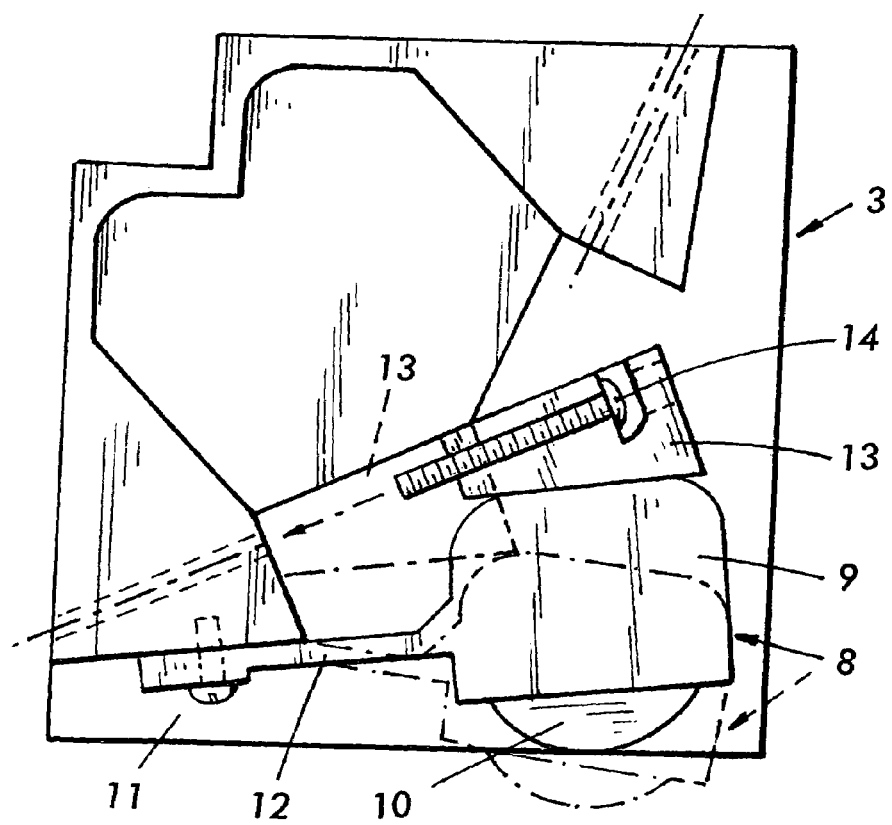
FIG. 7 is a partial view of the corner bracket showing roller height adjustment.

The screen corner bracket 1 is symmetrically formed to permit the roller assembly and jack-block to be mounted alternately at right angles to the arrangement shown in FIG. 7. This feature makes the corner bracket 1 non-handed and usable in all four corners of the door.

Figure 6:
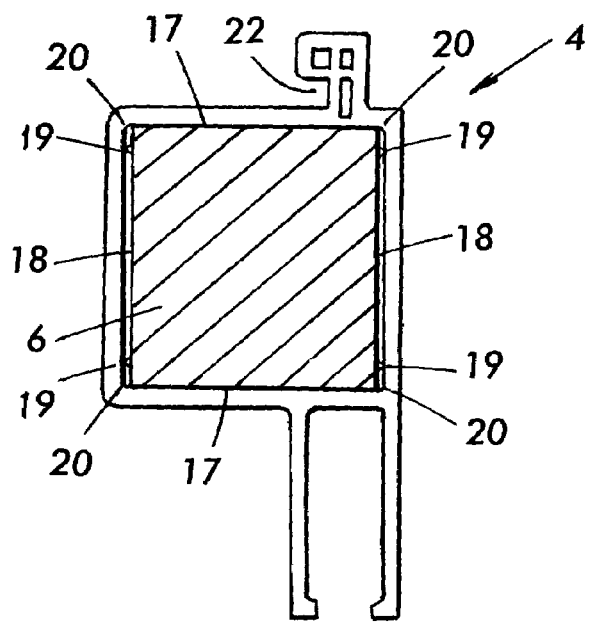
FIG. 6 is a cross-sectional view along the lines of VI—VI in FIG. 1.

A major goal of the invention is to guarantee a tight, rigid and accurate fit of the corner bracket posts 2 into an unpredictable extruded plastic hollow portion 5 which by the nature of the plastic extrusion process causes the inside diameter of the plastic hollow portion 5 to vary from part to part. This rigid and accurate fit must be accomplished in both planes. The dimension across the tips of the slanted fins 15, 16 of the corner bracket 1 is designed to occupy slightly more space than the largest inside diameter of the extruded frame hollow portion 5. When smaller diameters are encountered the fins simply deflect back to a steeper angle to accommodate corner insertion providing aligning and a tight fit in one plane 17 (see FIG. 6). The additional problem was to devise a simple method for adjusting for unpredictable and varying spacing 18 in the other plane. Since there is no economical method of molding slanted fins in two planes, the present invention incorporates simple gauge points 19 that occupy the lateral spacing 18 when larger hole diameters are encountered. The gauge points 19 are designed to progressively crush down in height when small hole diameters are encountered. The gauge points 19 have a pyramid shape (see FIG. 5) that guarantees equal crushing of all gauge points which thereby ensures centered alignment in the remaining plane. Thus, an extremely simple and effective way of maintaining tight alignment in two planes where unpredictable hole sizes are common place is provided. Furthermore, the fins 15, 16 include thicker fins 15 on which all the gauge points 19 are located. The thicker fins 15 provide additional cross-sectional stiffness needed to resist deflection during the insertion and crushing of the gauge points. The thicker fins 15 are shorter than the thin fins 16 and do not contact the interior of the extruded hollow portion 5. The only purpose of the thicker fins 15 is provide support for the gauge points 19.

In a preferred embodiment of the invention the gauge points 19 are arranged at the outboard ends of the thicker fins 15. This location positions the gauge points 19 as close as possible to the internal corners 20 of the extruded frame 4 (see FIG. 6). The corner 20 of the extruded hollow frame is the stiffest portion of the square frame hollow portion 5 and provides a maximum crushing force to the gauge points 19. If the gauge points 19 were moved inward away from the corners 20 the crushing force would tend to deflect the walls of the hollow frame member outwardly, effectively creating an undesirable loose fit and unwanted bulges in the walls.

Of course it is possible to mount a glass sheet in place of the screen and also to provide hinges at one side of the door frame so that the door is a swinging door rather than a rolling door.

The inventive kit includes four corner brackets, four lineal frame components, four aluminum reinforcements and a screen provided in a shipping tube whereby the door can be assembled at the construction site by cutting the lineal frame components to needed lengths with 90° cuts and then connecting these components with the corner components to form the door frame.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A corner element for a door, comprising a symmetric, L-shaped corner member having a corner portion and two posts that extend from the corner portion at a right angle to one another, the posts having a plurality of fins extending therefrom and including relatively thicker fins extending from each post and relatively thinner fins, the thick fins having lateral side surfaces, and further comprising a protuberance on the lateral side surfaces of each thick fin.

2. A corner element as defined in claim 1, wherein the thinner fins extend from the posts a greater distance than the thicker fins.

3. A corner element as defined in claim 1, wherein the protuberances have a pyramidal shape.

4. A corner element as defined in claim 1, wherein each protuberance is arranged on the lateral side surface of the thick fin in a region of a distal end of the thick fin.

5. A corner element as defined in claim 1, wherein the L-shaped member is made of plastic.

6. A corner element as defined in claim 1, wherein the corner portion has an outer periphery provided with a channel, and further comprising a roller assembly arranged in the channel of the corner portion.

7. A corner element as defined in claim 6, wherein the roller assembly includes a housing and a wheel that are injection-molded components, the housing having walls that define an interior shaped to accept the wheel, the wheel being rotatably mounted within the housing, a lever arm being attached to an exterior surface of the housing so as to project from the housing in rolling direction of the wheel, a distal end of the lever arm being fastened to the corner portion inside the groove so that the roller assembly is pivotable due to the flexing of the lever arm.

8. A corner element as defined in claim 7, and further comprising a wedge-shaped block movably mounted in the groove of the corner portion so as to be between the roller assembly housing and a base of the groove, the wedge-shaped block being movable so as to pivot the roller assembly by sliding contact therewith.

9. A corner element as defined in claim 1, wherein the fins are provided at both a distal end and a proximal end of the posts.

10. A door, comprising: four lineal door frame components, each of the lineal components having a cross-section defining an interior space extending in a longitudinal direction of the linear component; four symmetric, L-shaped corner members each having a corner portion and two posts that extend from the corner portion at a right angle to one another, the posts each having a length and a plurality of fins extending therefrom along at least portions of the length; and a metal reinforcement member arranged in the hollow portion of the lineal components so as to extend substantially along the entire length of the lineal components so as to leave an empty portion of the hollow section at each end of the lineal components, which empty portions have a length equal to at least the length of the posts of the L-shaped member, the posts of the L-shaped member being mounted in the free hollow portions of the lineal components so that at least some of the fins engage an interior surface of the lineal components, the fins including relatively thicker fins and relatively thinner fins, the thinner fins extending from the posts a greater distance than the thicker fins, the hollow portion of the lineal components having two pairs of opposing walls, the thin fins being arranged on the posts so as to project from opposite sides thereof and engage with one pair of the opposed walls of the lineal component.

11. A door as defined in claim 10, wherein the thick fins have lateral side surfaces, and further comprising a protuberance on the lateral side surfaces of each thick fin, the protuberances engaging with the other pair of opposing walls of the lineal components.

12. A door as defined in claim 11, wherein the protuberances have a pyramidal shape.

13. A door as defined in claim 11, wherein each protuberance is arranged on the lateral side surface of the thick fin in a region of a distal end of the thick fin.

14. A door as defined in claim 10, wherein the L-shaped member and the frame components are made of plastic.

15. A door as defined in claim 10, wherein the corner portion has an outer periphery provided with a channel, and further comprising a roller assembly arranged in the channel of the corner portion.

16. A door as defined in claim 15, wherein the roller assembly includes a housing and a wheel that are injection-molded components, the housing having walls that define an interior shaped to accept the wheel, the wheel being rotatably mounted within the housing, a lever arm being attached to an exterior surface of the housing so as to project from the housing in rolling direction of the wheel, the distal end of the lever arm being fastened to the corner portion inside the groove so that the roller assembly is pivotable due to the flexing of the lever arm.

17. A door as defined in claim 16, and further comprising a wedge-shaped block movably mounted in the groove of the corner portion so as to be between the roller assembly housing and a base of the groove, the wedge-shaped block being movable so as to pivot the roller assembly by sliding contact therewith.

18. A door as defined in claim 10, wherein the fins are provided at both a distal end and a proximal end of the posts.

19. A door as defined in claim 10, wherein the connected together lineal components and L-shaped members form a door frame with an inner periphery, the lineal components and the L-shaped members at the inner periphery having a longitudinally extending groove, and further comprising a screen mounted in the grooves at the inner periphery of the frame.

20. A door kit, comprising: four lineal door frame components, each of the lineal components having a cross-section defining an interior space extending in a longitudinal direction of the linear components; four symmetric, L-shaped corner members each having a corner portion and two posts that extend from the corner portion at a right angle to one another, the posts each having a length and a plurality of fins extending therefrom along at least portions of the length, the fins including relatively thicker fins and relatively thinner fins, the thinner fins extending from the posts a greater distance than the thicker fins, the hollow portion of the lineal components having two pairs of opposing walls, the thin fins being arranged on the posts so as to project from opposite sides thereof and engage with one pair of the opposed walls of the lineal component; a metal reinforcement member arranged in the hollow portion of the lineal components so as to extend substantially along the entire length of the lineal components so as to leave an empty portion of the hollow section at each end of the lineal components, which empty portions have a length equal to at least the length of the posts of the L-shaped member, the posts of the L-shaped bodies being mountable in the free hollow portions of the lineal components so that at least some of the fins engage in an interior surface of the lineal components; and a packaging tube, the lineal components and the L-shaped members being arranged inside the tube.

* * * * *